Oct. 6, 1964   J. H. KEMP, JR   3,151,754
APPARATUS FOR TRANSFERRING LOADS
Filed March 28, 1961   3 Sheets-Sheet 1

INVENTOR.
John H. Kemp Jr.
BY
ATTORNEY

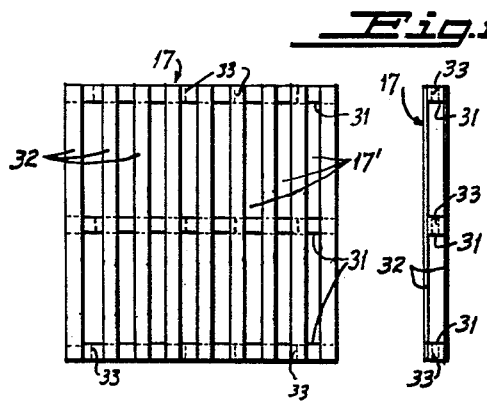
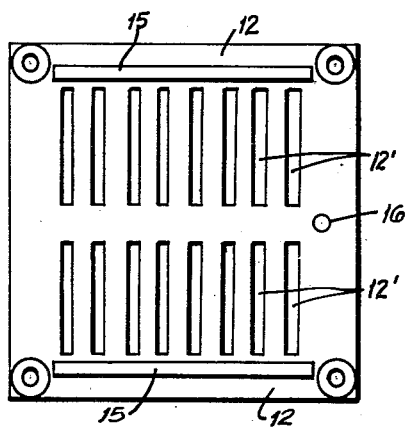
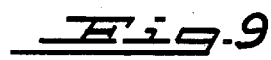
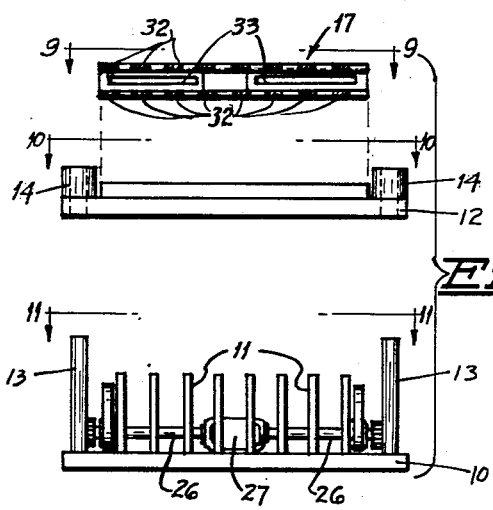
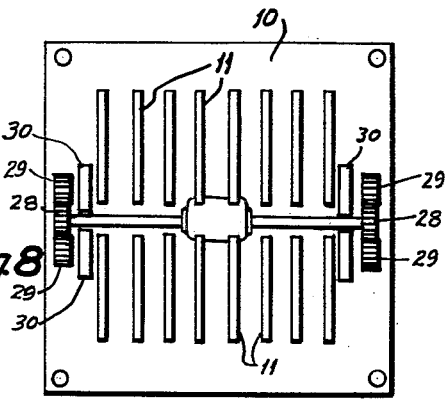
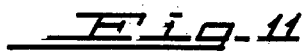
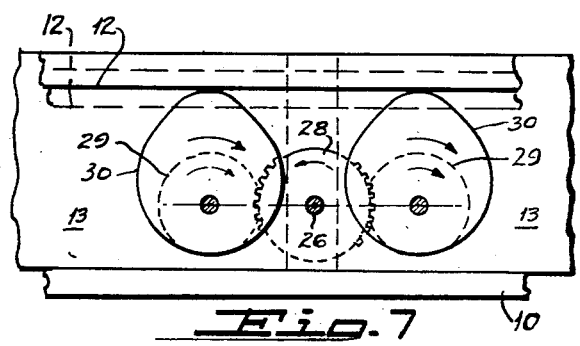

Oct. 6, 1964   J. H. KEMP, JR   3,151,754
APPARATUS FOR TRANSFERRING LOADS
Filed March 28, 1961   3 Sheets-Sheet 3

INVENTOR.
John H. Kemp Jr.
BY
ATTORNEY

United States Patent Office 3,151,754
Patented Oct. 6, 1964

3,151,754
APPARATUS FOR TRANSFERRING LOADS
John H. Kemp, Jr., 140 Greenoaks Drive,
Atherton, Calif.
Filed Mar. 28, 1961, Ser. No. 111,882
1 Claim. (Cl. 214—310)

This invention relates to the handling and transporting of loads of parcelled goods, such as stacks of boxes, cartons, bags, and the like, of merchandise in a system which involves the use of pallets and other load-carrying platforms which involve the use of lifting forks having load-carrying tines. More particularly, it relates to the transferring of loads of parcelled goods from the pallets or other load-carrying platforms of one owner to those of another owner in the warehousing and transporting of parcelled merchandise.

The use of small portable platforms called pallets is extensive as an aid in the handling of parcelled goods. These pallets or platforms are usually about 4′ x 4′ in size or thereabouts, but may sometimes be rectangular in shape, upon which a load of a ton or more of parcels, such as cartons of canned goods or the like, is stacked. The loaded pallets are lifted and hauled about a local area, as on a dock or within a warehouse, by an operator on a small power-operated vehicle or truck having an elevator fork with tines adapted to engage the pallet. In the transporting of the parcelled goods from the producing company to their final destination, such as a grocery store or other retailing unit, the goods must be handled by various intermediate agencies, such as trucking companies, steamship companies, warehousing units, and the like, which may mean in some instances as many as five to seven or more transfers of the goods during the route. Unless the pallets on which the parcels are originally stacked by the producing company are to travel the full journey of the goods, with the very likely prospect of never being returned or otherwise becoming lost, each such transfer of the good involves the man-handling of the individual parcels in order to remove them from the pallets or other load-carrying platform of one transporting unit to those of the next in order.

It is a primary object of this invention to provide a load-transferring system and apparatus by which the transfer of a pallet load or similarly stacked parcelled merchandise may be quickly transferred from one load-carrying platform or other such load-carrying unit to another and with a saving in labor and cost.

Another object is to provide an improved type of pallet for use in the handling of parcelled goods.

Other objects and advantages of the invention will appear from the ensuing description and the appended claim.

One form of the invention is illustrated by way of example in the accompanying drawings and is described in detail hereinafter. The particular constructions herein shown and described are to be construed as illustrative only, and not as limiting the invention.

In the drawings:

FIG. 7 is a fragmentary elevational view showing diagrammatically gear-operated cams for raising and lowering the movable platform of the apparatus of FIG. 1.

FIG. 8 is an exploded view of the structure shown in FIG. 1, and showing in elevation: (a) the base with its supported pillars, (b) the movable platform, and (c) the pallet of the assemblage of FIG. 1. In addition the cam lifting mechanism of FIG. 7 is shown in association with the said base.

FIG. 9 is a view on line 9—9 of FIG. 8 showing a plan view of the pallet of the assemblage of FIG. 1.

FIG. 10 is a view on line 10—10 of FIG. 8 showing a plan view of the movable platform of the assemblage of FIG. 1.

FIG. 11 is a view on line 11—11 of FIG. 8 showing a plan view of the base, and the upwardly extending pillars secured thereto, of the assemblage of FIG. 1. It also shows in plan view the cam lifting mechanism of FIG. 7.

FIG. 12 is an end elevation view of the pallet shown in FIG. 9.

Figure 2:
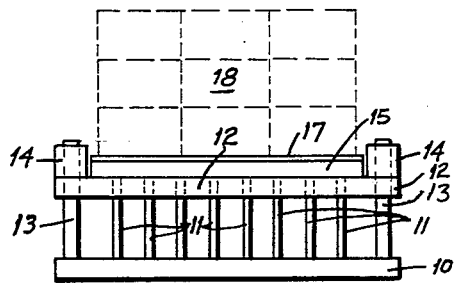
FIG. 2 is a vertical side view of the apparatus of FIG. 1 in one of its operative positions, and with a pallet and its load of parcels of merchandise in one position relative to the apparatus.

Referring to the drawings:

A base 10 (FIGS. 2, 3, 4, also 8 and 11), anchored to the floor or ground area by any appropriate means (not shown) so as to remain in a stationary position, has secured to it a multiplicity of vertically extending pillars 11. These pillars are arranged in regularly spaced rows and are of such size that the tines of a multi-tined lifting fork can be inserted between the rows. In the embodiment shown, there are eight rows of such pillars, with two pillars in each row; and the area of that portion of the base 10 from which these pillars arise approximates the horizontal area of the load-carrying surface of a pallet as conventionally used in the handling of stacks of parcelled merchandise. The individual pillars shown in the drawings are of an elongated rectangle in cross-sectional area (See FIG. 11), but this particular form is not necessary and pillars having other cross-sectional forms may be employed. For example, the pillars may be square in cross section, or even circular. The number of pillars in each row may also vary as desired. It is, however, a primary feature of my apparatus that the cross-sectional areas of the pillars, taken collectively, shall be sufficient to constitute a load-carrying surface capable of supplanting the load-carrying surface of a pallet used with fork lifts for carrying a load of stacked parcels of merchandise—all as hereinafter more fully explained. Also, to serve this purpose, all of the pillars 11 have their upper ends residing in a common horizontal plane. The stationary base 10 may be of either metal or wood, as desired, and may be of and suitable framework construction appropriate for the anchoring thereto of the upright or upwardly extending post-like pillars 11.

A movable platform 12 (FIGS. 1 to 4, also FIGS. 8 and 10) is provided with transverse openings 12' (FIG. 10) therethrough, corresponding in number and position to the pillars 11, the size of said openings being such that the pillars 11 fit freely into them, thus permitting this movable platform to be positioned over the base 10 with the pillars 11 protruding through said platform 12. The platform is thus movable upwardly and downwardly about said pillars. Desirably, though not necessarily, vertically extending guideposts 13 may be secured to the base 10, one at each corner of said base, and guide bushings 14 adapted to provide an easy sliding fit over said posts 13 may, if desired, be secured to said movable platform 12, one corresponding to each said guidepost, for convenience in keeping the platform 12 in proper alignment as it is moved upwardly and downwardly over the pillars 11. Guiding means of this or any other appropriate form for the movable platform 12 may be particularly useful if the size of the openings in the movable platform through which the pillars 11 extend is appreciably larger than the pillars so that the pillars do not provide a snug fit as the platform 12 is moved upwardly and downwardly. Means for moving the platform 12 upwardly and downwardly will be hereinafter described. Secured to the upper face of the platform 12, above each of its two opposite sides, is a guide rail 15 (FIGURE 1 and FIG. 10), the distance between said guide rails being just slightly greater than the width of a pallet, later to be described, so that said guide rails serve to keep the pallet in proper position as it is moved onto said platform, as hereinafter more fully explained. A stop 16 (FIG. 10) is removably secured at one end of the platform 12, to its upper face, and serves to stop the aforesaid pallet as it is moved into position on the platform 12. In instances where it is desired to move the pallet off the platform 12 horizontally, the stop 16 may be removed so that it will not prevent such movement. For such purposes, the stop 16 may be a pin, with an appropriate hole formed in the upper face of the platform 12 into which the stop 16 may be positioned, and from which it may be removed, as desired.

Figure 1:
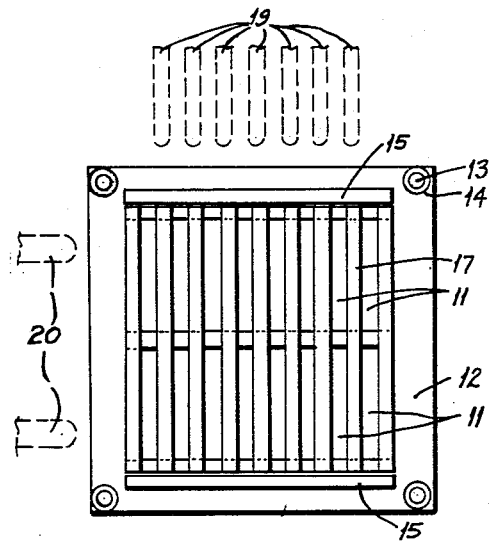
FIG. 1 is a plan view of an assemblage of one form of apparatus embodying my invention and showing the tines of two different types of fork lift in one of their operative relationships to my apparatus.

A pallet 17, hereinafter more fully described, preferably of size that may be handled by a conventional lifting fork, is proved with a series of openings 17' (FIG. 9) extending transversely (i.e., vertically) therethrough, the said openings corresponding in number and position to the pillars 11, and the size and shape of said openings being such that the pillars 11 will move freely into them and occupy generally the cross-sectional area of said openings, the same as with the movable platform 12, as hereinabove explained. Thus, in the embodiment shown in the drawings, there are eight rows of such openings, with two openings per row, each said opening being of elongated rectangular shape (FIGS. 1 and 9). It will thus be seen that when the movable platform 12 is elevated to a position whereby its upper surface is in the plane in which lie the upper ends of the pillars 11, a fairly uniform surface is provided on which may be moved the pallet 17 to a position wherein the transverse openings through said pallet are positioned over and in alignment with the pillars 11. Such position of the pallet 17 in relationship to the movable platform 12 and to the upper ends of the pillars 11 is shown in the elevational view of FIG. 2, in which is shown also a load of stacked parcels 18 borne on the load-carrying surface of the pallet 17. Once the pallet 17 with its load of parcels 18 is on the platform 12 with the transverse openings through the pallet in alignment with the pillars 11, the platform 12 may be lowered along, i.e., over, the pillars 11, in which event, the vertical openings through the pallet will engage the pillars, and the pallet will ride down with the platform (the pillars protruding through the pallet), leaving the load of stacked parcels 18 supported on the upper ends of the pillars 11, as shown in the elevational view of FIG. 3. With the load of parcels 18 thus supported by the pillars 11, the tines 19 of a multi-tined lifting fork may then be inserted below the load of parcels and between the rows of the pillars 11 and the lift fork operated to lift the load of parcels off the pillars and to transfer the stacked parcels to another location as desired. In the elevational view of FIG. 4, the several tines 19 of a multi-tined lift fork are shown in cross section in their position between the rows of pillars 11 and beneath the stack of parcels 18. And in the plan view of FIG. 1, the tines 19 of a multi-tined fork are shown fragmentarily in position relative to the assembly of the pillars, the platform, etc. before insertion between the rows of pillars for a lifting operation such as that just above explained. In this same plan view of FIG. 1 are shown fragmentarily the tines 20 of a conventional 2-tined lift fork for use in bringing a loaded pallet into position for being moved onto the apparatus where it takes the position shown in FIG. 2 and explained above.

Figure 3:
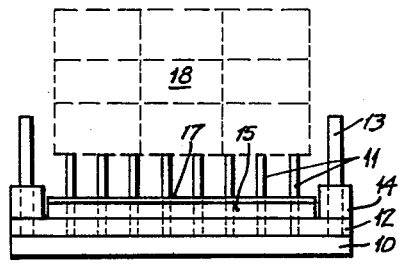
FIG. 3 is a vertical side view of the apparatus of FIG. 1 in another of its operative positions, and showing the pallet load of FIG. 2 supported by the apparatus independently of the pallet.
Figure 4:
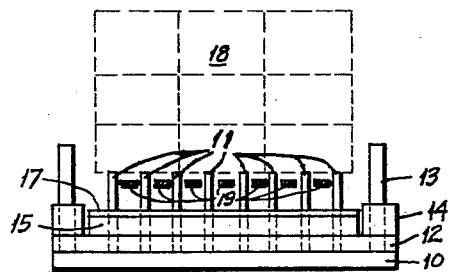
FIG. 4 is the same vertical side view as in FIG. 3 with the addition of a fragmentary view in cross-section of one of the set of fork tines of FIG. 1 in position to lift the pallet load.
Figure 5:
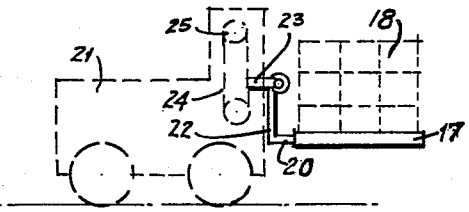
FIG. 5 is a diagrammatic side elevational view of a fork lift truck with its fork tines supporting a pallet on which is a load of parcelled goods.
Figure 6:
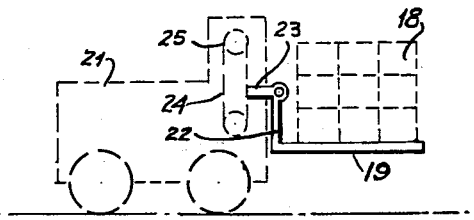
FIG. 6 is a similar view with the fork tines of a lift truck supporting a load independently of any pallet.

In FIGS. 5 and 6 are shown diagrammatically a lifting fork of the type suitable for the handling of loads in connection with my system and apparatus. The lifting fork tines (20 in FIG. 5 and 19 in FIG. 6) are mounted on a small truck 21 of the conventional self-powered type steerable by an operator. In the structure illustrated, the fork is provided with upstanding arms 22, fastened to a crossbar 23 on the front of the truck. Suitable elevator means is also provided on the truck for raising and lowering the fork while maintaining it horizontal. A chain 24 driven by sprockets 25 is shown connected to the cross-bar 23. However, any other type of elevator mechanism may be employed. FIG. 5 shows the fork tines 20 carrying a pallet 17, the said pallet supporting the load 18—which operation may be employed for placing the loaded pallet 17 in position on the movable platform 12 and over the pillars 11 as shown in FIG. 2. FIG. 6 shows the fork tines 19 carrying a load of parcels 18 independently of any pallet—the initial stage of which operation is shown in FIG. 4.

It will be seen that, by carrying out the operations as above described, when a pallet belonging to one owner (for example, the manufacturer of merchandise) and loaded with stacked parcels, is brought, say, to a warehouse, or to the dock of a steamship company, where the merchandise is to be received by another transporting system and transported to distant points, it being desirable that the merchandise still be transported by the second transporting system while in the form of stacked parcels borne by pallets, my system and apparatus provide a ready means for transferring the stacked parcels from the first owner's pallets and loading them onto pallets owned by the transporting company that takes the goods to the distant points, thereby releasing the first owner's pallet for return to him or for other appropriate disposition. Thus, when the multi-tined fork takes the load of parcels 18, as shown in FIG. 4, this lift fork may move to one side, whereupon the movable platform 12 may then be raised back to the position where it is level with or above the tops of the pillars 11, as shown in FIG. 2, but with the parcels 18 not present. The empty pallet may then be removed from the apparatus for return to the manufacturer or other appropriate disposition, and an empty pallet owned by the second transporting unit placed in its stead on the movable platform 12 with its openings 17' in alignment with the pillars 11, the platform then lowered, the multi-tined fork then placing its load of parcels on the upper ends of the pillars 11, the platform then raised to bring the second owner's pallet into contact with the stacked parcels, i.e. to take the load of parcels, the multitined fork then taken away, and the newly loaded pallet then taken away by any desirable means, such as by a conventional two-tined fork operating to lift the newly loaded pallet, or by moving the newly loaded pallet on to an adjacent conveyor, such as I have hereinafter described. In the operation of transferring the load of stacked parcels from one owner's pallet to the pallet of another owner, i.e. of the next transporting unit, instead of the multitined fork being moved to one side simply for redeposit of the stacked parcels on the same assemblage of apparatus (after the second owner's pallet has been placed thereon), a second assemblage of the apparatus may be provided nearby on which may be positioned the pallet of the next transporting unit, so that the stacked parcels may be transferred thereto from the multitined fork.

To raise and lower the platform 12 I provide a set of gear-operated cams as shown in FIGS. 7, 8 and 11. A cam shaft 26, positioned horizontally above the base 10 and below the movable platform 12, is driven by a motor 27 suitably mounted on the base 10, the motor being preferably positioned midway between the two ends of the base 10, and the shaft extending along a median line of the base from the motor to each of said ends of said base, appropriate bearings, not shown, being provided therefor. A gear 28 secured to each end of the shaft 26, drives a pair of gears 29, each suitably mounted on a separate shaft. Secured to the shaft of each of said gears 29 is a cam 30 having a continuous cam surface adapted to bear constantly on the lower surface of the movable platform 12, said cam surface having its point of greatest radial distance from its cam shaft such that when said point bears upon said platform the platform is at its greatest elevation above the base 10; and having its point of least radial distance from its cam shaft such that when said latter point bears upon said platform the platform is at its lowest elevation above said base 10. Other means may be employed for raising and lowering the platform 12.

The movable platform 12 may be of wood or metal frame work construction as desired, which will provide for the required number and shape of vertical openings therethrough for the reception of the pillars 11 as aforesaid, as well as support for the guide rails 15 on each side of the upper surface of said movable platform.

The pallets 17 may be of metal or wood, as desired, or even of plastic material that may give the strength required to support the load of stacked parcels. They will generally be from three to four inches in overall vertical thickness or depth, although other depths may be employed, as desired. In the embodiment shown (FIGS. 8, 9, and 12), three sill or foundation members 31 are positioned horizontally and parallel to each other, one along the middle and one at each side edge of the pallet. Spaced bars 32, extending at right angle to said sill members, are secured to both the upper and lower faces of said sill members and provide the load carrying surface of the pallet, depending on whichever side of the pallet is uppermost, since both the upper and lower faces of the pallet are thus alike. The spaces between the three sill members 31 and the several bars 32 comprise the vertical openings 17' through the pallet, and which are occupied by the pillars 11 when the pallet, resting on the movable platform 12, is lowered over said pillars in the operations as hereinabove described. As explained hereinabove, the spaces 17' are of such area that the upper ends of the pillars 11, taken collectively, and when protruding through said openings, constitute a load-carrying surface which will support the load or parcels when the pallet is lowered over said pillars. With a pallet of this construction the ends of the pallet, between the sill members 31, are open. These horizontal openings together with the spaces between said sills provide ready access for the insertion of the tines of a two-tined fork at either end of the pallet for lifting said pallet. Two horizontal slots 33 (FIGS. 8 and 12) extending horizontally and transversely through each of the three sill members 31, provide for the insertion of the two tines of a two-tined lift fork, should it be desired at any time to lift the pallet with such a fork by an approach from either side of the pallet instead of from the end of the pallet.

Instead of using a lift fork for bringing a loaded pallet on to the movable platform 12 for the transfer of the load of parcels to another pallet, and a lift fork for taking the loaded second or substituted pallet off the platform 12, as hereinabove described. I may employ a conveyor, such as a roller conveyor, for bringing a loaded pallet up to the platform 12, or for taking a loaded pallet away from said platform, or for both such operations. And to facilitate the movement of the pallet on the said platform I may employ a lug belt on the guide rails 15 of the platform 12 for engagement with appropriate notches on the side edge of the pallet.

Figure 13:
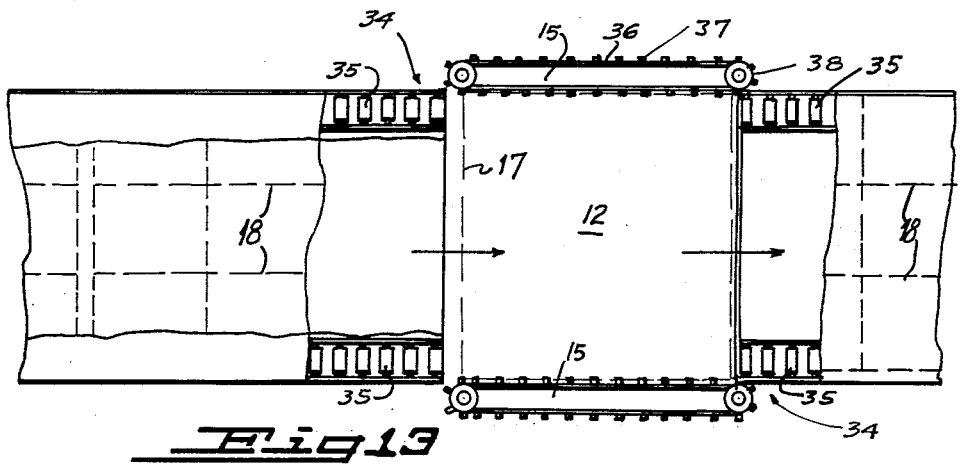
FIG. 13 is a diagrammatical view of conveyor sections in association with the assemblage shown in FIG. 1. It also shows a lug belt in association with the platform of said assemblage.

In FIG. 13 there are shown one form of such conveyor sections, and also a form of such a lug-belt arrangement. In these arrangements the primary structural parts are shown somewhat diagrammatically, appropriate mountings and the like for same not being shown. A conveyor section, designated generally as 34 and positioned adjacent an end of the platform 12 and its assemblage, is provided with a row of short rollers 35, mounted to turn on horizontal axes, one such row being positioned on each side of an appropriate supporting framework (not shown) whose width approximates that of a pallet. Thus a pallet, loaded or empty, may be placed on the conveyor section so that it will be supported equally on the two rows of rollers, whereupon it may be readily moved along the conveyor section and on to the platform assemblage. A similar conveyor section may be positioned adjacent the opposite end of the platform on to which the pallet may be moved. The conveyor sections may be of any desired length, and may therefore be of such length that a number of loaded pallets may be placed thereon in end to end fashion, the conveyor section serving as "storage," so to speak, in instances where a number of loaded pallets, as from a large transporting truck, are to have their loads transferred to other pallets. Any appropriate form of conveyor sections may be employed. Thus, in lieu of the two rows of short rollers, there may be a single row of longer rollers (of appropriate length).

Figure 16:
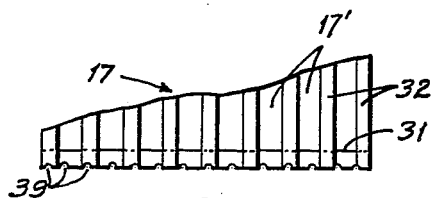
FIG. 16 is a fragmentary plan view of a pallet showing notches in a side sill member thereof for the meshing therewith of lugs of the lug belt shown in FIG. 13.

Referring further to FIG. 13, an endless lug belt 36, provided with a series of lugs 37 and carried on a pair of sprocket wheels 38, appropriately mounted on vertical shafts (not shown), one of which is driven by any appropriate means, not shown, is positioned to travel along the inner face of each of the guide rails 15 of the platform 12 (said guide rails having been hereinbefore described). Notches 39 (FIG. 16) formed in the outer face of each outermost sill member 31 of pallets 17 are appropriately shaped and positioned for the meshing therewith of the lugs 37 on the lug belts 36. When the lug belts are driven in appropriate direction the pallet is moved toward the right or the left, as may be desired. Thus the lug belt may, if desired, be used to align the vertical openings in the pallet with the pillars 11 (as hereinbefore described) as well as for moving the pallet forward toward and on to the off-conveyor section 34.

Figure 14:
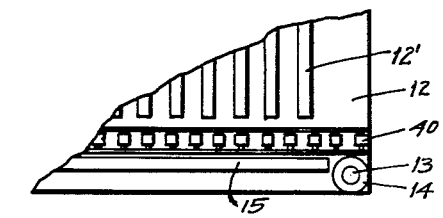
FIG. 14 is a fragmentary plan view showing rollers in the floor of the platform shown in FIG. 10.

To facilitate in the movement of the loaded pallets across the platform 12 I may provide a series of short rollers suitably mounted in the upper face of said platform along the inner side of each of the guides 15 of the platform 12. Such a series of rollers is shown diagrammatically, and indicated by the reference numeral 40, in FIG. 14.

Figure 15:
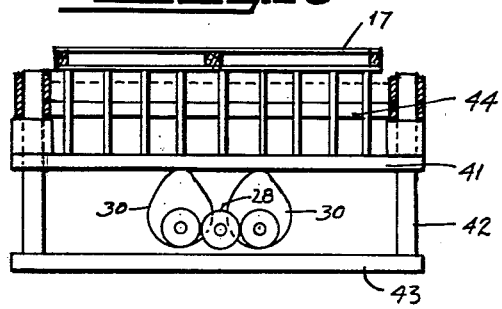
FIG. 15 is a side elevational view of a modification of the assemblage shown in FIG. 1.

In FIG. 15 there is shown, somewhat diagrammatically, a modification of my assemblage of pillars and platform, in which the pillars 11, instead of being secured to a fixed base whereby they remain stationary, are secured to a base 41 which is movable upwardly and downwardly so that the pillars, as a body, are caused to be moved upwardly and downwardly, the said pillars having the same cross-sectional area arrangement, etc. as in the assemblage where they are secured to the fixed base 10 heretofore described. Appropriate guide posts 42 keep the movable base 41 in proper vertical alignment as it is moved up and down. Said guide posts are secured to an appropriate fixed base 43 and the same type cams 30, driven by gears 28 etc. as described hereinabove in connection with FIG. 7 for raising and lowering the movable platform 12 of the assemblage heretofore described, may be provided for raising and lowering the base 41 with its pillars 11. A fixed or stationary platform 44 suitably secured to the guide posts 42, is positioned at an elevation above the movable base 41 and is provided with vertical openings therethrough corresponding in size, number and arrangement to the pillars which are secured to the movable base 41, and therefore to the openings 12' (FIG. 10) through the movable platform 12 of the previous assemblage. Thus a loaded pallet 17 may be brought on to the fixed platform 44 and positioned with its vertical openings 17' (FIG. 9 and FIG. 16) in alignment with the vertical openings through the fixed platform 44. The movable base 41 is then raised to bring the upper ends of the pillars 11 up through the pallet 17 and to lift the load clear of the pallet, the load then being supported solely by the pillars, the same as that shown in FIG. 3 for the previous assemblage. A multitined fork may then be used to lift the load off the pillars and to move to one side until the empty pallet is removed and another pallet put in its place, whereupon the multitined fork is manipulated to replace the load upon the pillars. The pillars are then lowered so that the load will be borne by the new pallet.

While I have shown the preferred form of my invention, it is understood that various changes may be made in its construction by those skilled in the art, without departing from the spirit of the invention as defined in the appended claim.

I claim:

The combination of portable pallets and a load transfer apparatus, said portable pallets each comprising:
an upper load-supporting deck and a lower ground-engaging surface spaced from said deck to permit the insertion of the tines of a lift fork therebetween,
said load supporting deck comprising a plurality of spaced generally parallel load-supporting slats forming alternating series of slats and slots across said load-supporting deck, and
means forming through openings in said ground-engaging surface aligned with said slots so that said slots form vertical through openings,
said load transfer apparatus comprising:
a stationary base member,
a platform having a substantially horizontal upper face,
a plurality of vertical passageways formed by slots extending through said platform,
said passageways being configured and spaced to conform to the size, shape and spacing of said slots in said pallets,
an array of upright, horizontally spaced pillars registering with said passageways,
each of said pillars having an elongated horizontal, top load-supporting surface of a size and shape to fit closely within the passageway with which it is in registry,
said pillars being sufficient in number and so spaced that the total area of the top, load-supporting surfaces thereof is approximately equal to the total area of the load-supporting slats of a pallet whereby said pillars are capable of supporting a load of packages that may be supported on a pallet,
one of said platforms and said array of pillars being fixedly mounted on said base member and the other being mounted thereon for vertical movement between a loading position wherein the top surfaces of said array of pillars do not extend above the upper face of said platform and a second position wherein said array of pillars projects upward from said upper face to position said top surfaces in a plane displaced above said upper surface a distance in excess of the space between the load-supporting deck and the ground-engaging surface of a pallet by an amount sufficient to permit the insertion of the tines of a lift fork between individual ones of said array of pillars and vertically intermediate said top surfaces and said load-supporting deck,
means for effecting said vertical movement, and
means for guiding the location of a pallet on said platform while said platform and said array of pillars are in said loading position so that the slots therein are in vertical alignment with said vertical passageways.

References Cited in the file of this patent

UNITED STATES PATENTS

| | | |
|---|---|---|
| 2,176,307 | Lamb et al. | Oct. 17, 1939 |
| 2,412,009 | Rickland | Dec. 3, 1946 |
| 2,639,050 | Hoffman | May 19, 1953 |
| 2,783,900 | Roberts | Mar. 5, 1957 |

FOREIGN PATENTS

| | | |
|---|---|---|
| 659,226 | Great Britain | Oct. 17, 1951 |
| 1,061,502 | Germany | July 16, 1959 |